United States Patent [19]

Oggioni et al.

[11] 4,103,602
[45] Aug. 1, 1978

[54] AUTOMATIC HYDRAULIC MACHINE FOR PREPARING INFUSIONS, IN PARTICULAR OF COFFEE

[76] Inventors: Marco Oggioni, Via Tritone 12;
Vinicio Rastrelli, Via A. Volta 27/22, both of Genova, Italy

[21] Appl. No.: 795,548

[22] Filed: May 10, 1977

[30] Foreign Application Priority Data

May 28, 1976 [IT] Italy ............................ 23778 A/76

[51] Int. Cl.$^2$ .......................................... A47J 31/34
[52] U.S. Cl. ............................................ 99/289 D
[58] Field of Search ............ 99/289 R, 289 D, 289 T, 99/289 P, 302 R, 302 P

[56] References Cited

U.S. PATENT DOCUMENTS

| | | | |
|---|---|---|---|
| 2,943,556 | 7/1960 | Egi | 99/289 D |
| 2,996,974 | 8/1961 | Fry | 99/289 D |
| 3,593,649 | 7/1971 | Novi | 99/289 R |
| 4,034,660 | 7/1977 | Omboni | 99/289 R |

*Primary Examiner*—Robert W. Jenkins
*Attorney, Agent, or Firm*—Holman & Stern

[57] ABSTRACT

This invention relates to a completely automatic machine for preparing infusions, particularly coffee infusions, suitable for all cases in which complete automation coupled with excellent infusion quality are important. The machine according to the invention comprises an infusion cylinder, which is driven to rotate stepwise through successive operating stations in which the infusion substance is fed, the infusion is prepared and the used substance is discharged, respectively.

6 Claims, 5 Drawing Figures

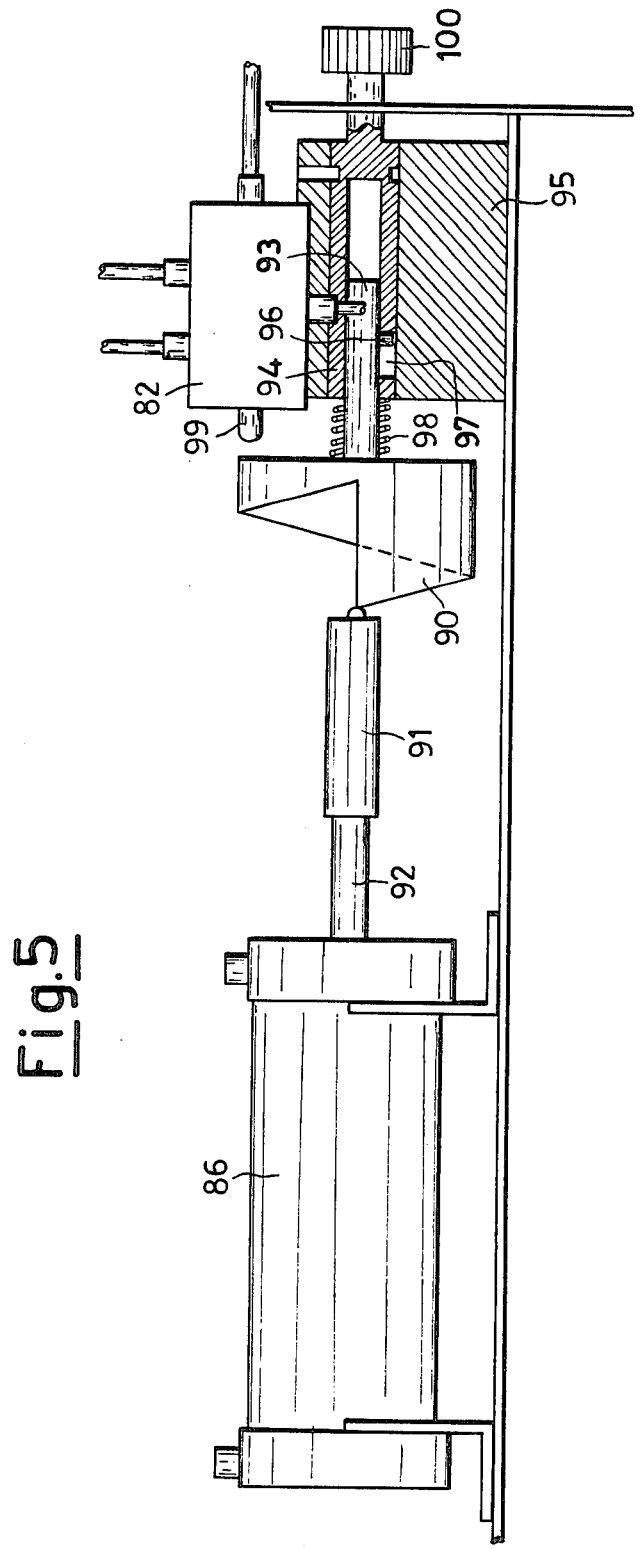

AUTOMATIC HYDRAULIC MACHINE FOR PREPARING INFUSIONS, IN PARTICULAR OF COFFEE

This invention relates to a completely automatic machine for preparing infusions in general, and in particular coffee infusions, suitable for all cases in which complete automation coupled with excellent infusion quality are important.

Known machines for preparing coffee infusions from ground coffee grains completely automatically on starting the cycle do not give the excellent results obtainable from manual or semi-automatic machines even through they are very complicated and costly.

Moreover, said automatic machines are unable to completely utilise the ground coffee even though the infusion produced is of relatively mediocre quality, and thus they require larger doses.

Furthermore, as said machines are constructed with electromagnetic, electromechanical and electronic operating and control elements, they are subject to faults even the slightest of which can lead to machine stoppage and require the intervention of specialised technicians for re-starting, with all that this implies.

One object of the present invention is to provide a coffee machine of the "completely automatic" type, i.e. comprising automatically operating devices and arranged to transform previously roasted coffee grains into an infusion of the highest quality and prepared at high pressure.

A further object is to provide an improved machine in comparison to known machines, comprising a self-contained element which when operated by the operator can instantly change the quantity of boiling water traversing the coffee machine so as to obtain infusions of any concentration at will.

A further object is to provide a machine of the maximum reliability, as its basic parts are constructed using only hydraulic components which are notably not subject to jamming or faults other than those due to normal material wear. Consequently, the intervention of specialised personnel for overcoming machine stoppages is required only in exceptional cases, and almost exclusively only for replacing worn elements, and this during ordinary maintenance periods.

A further object is to provide a machine which is easily used and which after setting in motion by a very simple operation completes all the necessary stages without any control by the operator, until the cycle is complete. This latter characteristic means that the machine according to the present invention is already suitable for operation in conjunction with a known token or coin operating device, which can be immediately connected to it.

A further object of the present invention is to provide a machine of very small size in comparison with known machines but which gives a pressure infusion of greater quality obtained in the same time.

A further object of the present invention is to provide a machine in which the various stages are controlled by hydraulic components immediately available in the various international markets, and which are mass produced and for general use, thus being of very low purchase price but at the same time of highest reliability as they are designed for high-level technology installations.

The aforesaid objects are attained by the machine according to the invention, comprising in combination an infusion unit including a casing with four apertures disposed at 90° one to another; an infusion cylinder with two opposing chambers fed alternately with a predetermined measure of hot water under pressure from a boiler fed by a hydraulic dispensing cylinder; two hydraulic pistons carrying a diffuser filter in said chambers and interconnected by a central rod slidable in an intermediate chamber by which the hot infusion water is fed through the intermediate chamber and alternately into the two chambers and then through the diffuser filter via holes; a hydraulic motor rotating said infusion cylinder stepwise so that its two chambers become successively aligned with the four apertures, at two of said apertures there acting two respective opposing hydraulic presser pistons such as to press one of the two filter-carrying pistons against a counter-filter carried by a first of said presser pistons, such that between said diffuser filter and counter-filter there is clamped a predetermined dose of coffee powder previously fed through a third of said four apertures, said dose being traversed by the hot water required for preparing the infusion under the perfect seal obtained by compressing a gasket, the infusion being delivered through a duct partly provided in the first presser piston, the used coffee cake being discharged downstream through the fourth aperture by a nozzle also fed with high pressure water.

The structural and operational characteristics of the invention and its advantages over the known art will be more evident from the description given hereinafter by way of example with reference to the accompanying drawings in which:

FIG. 5 shows the dispensing device.

Figure 1:
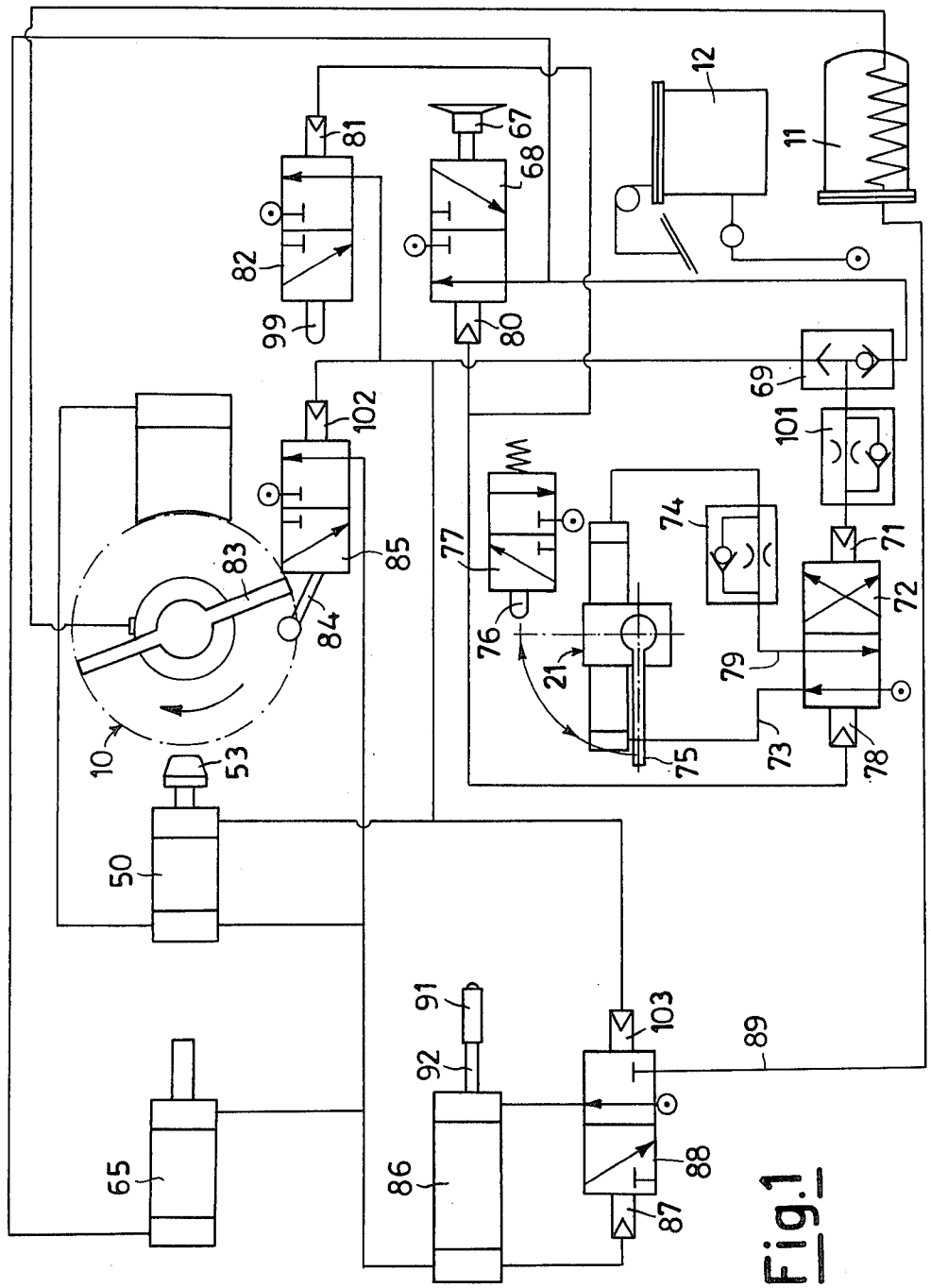
FIG. 1 shows the hydraulic circuit of the machine.

With reference to FIG. 1, the machine according to the invention comprises an infusion unit indicated overall by 10, which is fed with pressurised hot water from a normal coiled boiler 11, fed at the control of the hydraulic valve 88 by a vessel or autoclave 12 of known type, containing cold water at high pressure.

The infusion unit 10 is made to operate in the correct working sequence by the hydraulic circuit shown in FIG. 1, the detailed description of which is given hereinafter together with the operation of the machine.

According to the invention, the infusion unit 10 (FIGS. 2–4) is structurally in the form of a casing 13 in which an infusion cylinder 14, preferably lined with a suitable heat insulating material, rotates. In the example shown, the casing 13 is cylindrical but in practice it could be of different shapes.

The cylinder 14 (FIG. 3) is mounted to rotate on coaxial pivots 15, 16 rotatable in respective seats 17, 18 in the casing 13, the pivot 15 by way of a rolling bearing 19 and the pivot 16 by way of a free wheel 20.

The infusion cylinder 14 is rotated by a hydraulic motor 21 comprising a drive shaft 22 extending from a box 23 and operationally connected to the free wheel 20. A pinion 24 is keyed on the shaft 22 and engages with a rack 25 extending in a sealed manner through the box 23, the pistons 26 of the cylinder 27 of said hydraulic motor being rigid with its two ends. The infusion cylinder 14 could obviously be rotated by suitable different drive means.

The infusion cylinder 14 comprises two opposing chambers 28, 29 in which respective pistons 30, 31 carrying diffuser filters slide and are interconnected by a central rod 32. The rod 32 moves in a chamber 33 of smaller diameter which extends between the chambers 28, 29. In this manner a distribution chamber 33 is formed with the aid of two suitably spaced annular gaskets 34, and is fed by a duct 35 passing through the pivot 15. The duct 35 is directly connected to a distributor 36 fixed to the casing 13 and fed by the boiler 11. The distribution chamber 33 is connected alternately to the chambers 28 and 29 respectively, through the passages 37, 38 provided at the opposing ends of the chamber 33 by the movement of the rod 32.

Each filter-carrying piston 30, 31 is locked on the relative end of the rod 32 by a nut 39 screwed on a corresponding threaded portion of the rod. As is evident from the drawings, the nut 39, together with a cylindrical skirt 40 of the respective piston, forms an annular chamber 41 which is closed at the end opposite the piston by a removable diffuser filter 42, screwed by a screw 43 on the nut 39. The annular chamber 41 is connected via a series of bores 44 in the piston 30, 31, to the respective chamber 28, 29.

Figure 2:
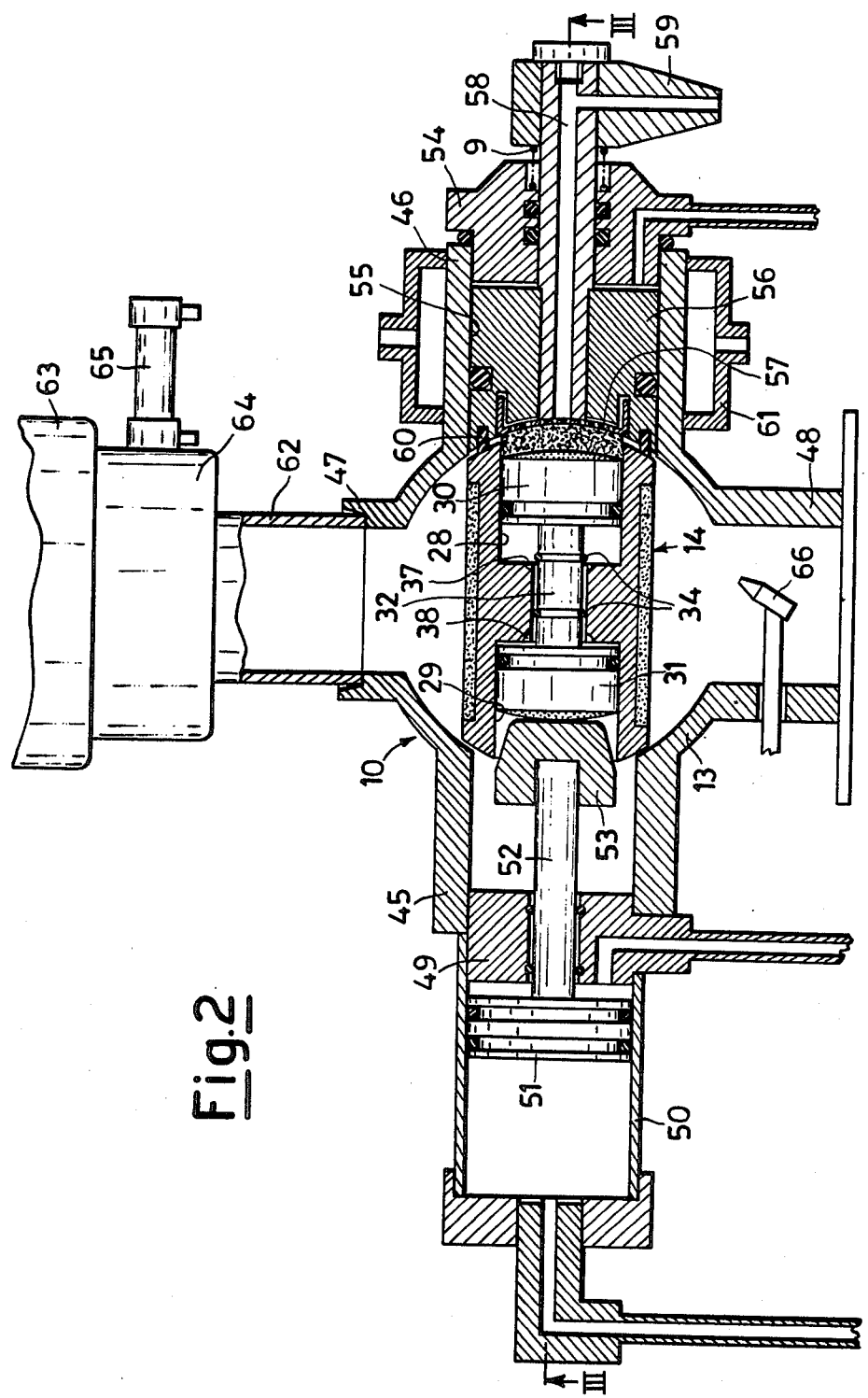
FIG. 2 is a section through the infusion unit on the line II—II of FIG. 3, showing the infusion cylinder in a working position.
Figure 3:
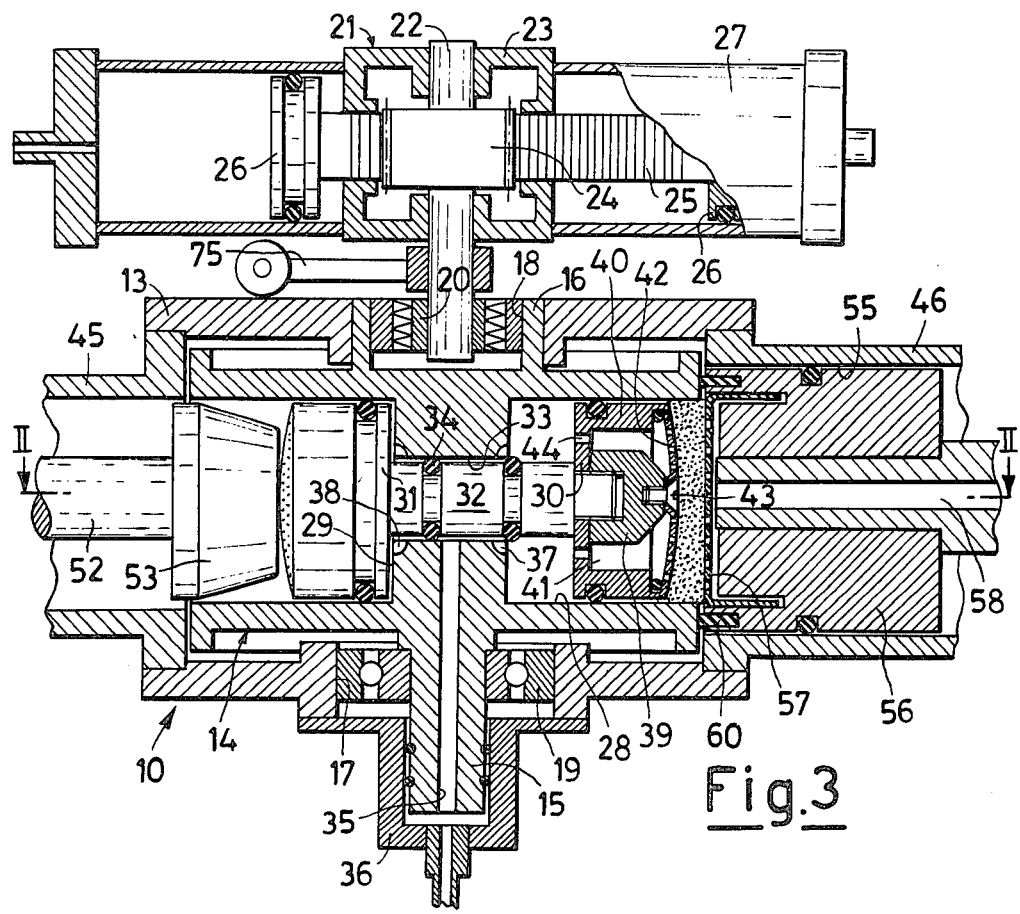
FIG. 3 is a section on the line III—III of FIG. 2.
Figure 4:
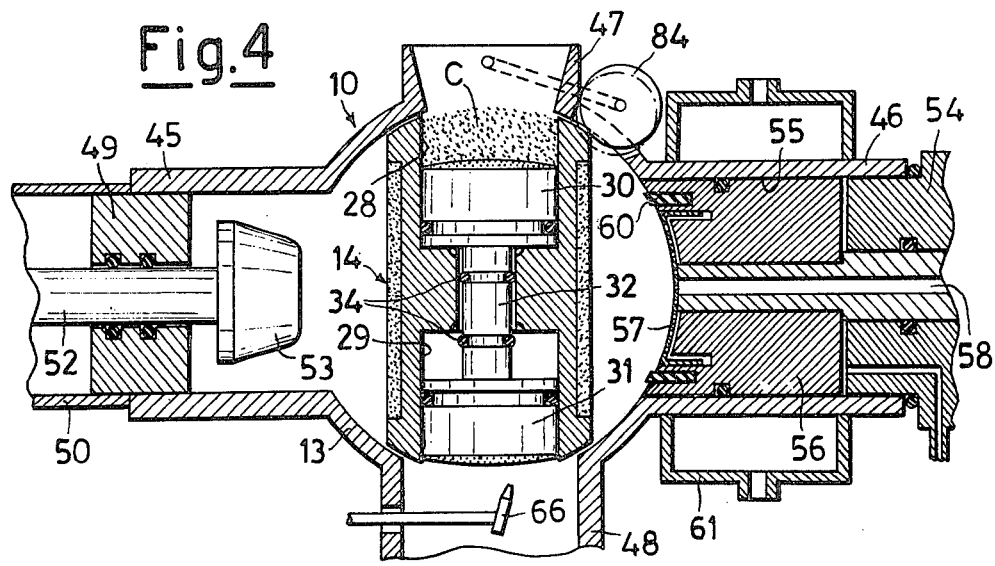
FIG. 4 is a section as FIG. 2, but showing the infusion cylinder in a different working position at 90° to the former.

FIGS. 2, 3 and 4 show the casing 13 comprising four apertures 45, 46, 47 and 48 disposed at 90° one to the other, and which are faced alternately by the chambers 28, 29 of the infusion cylinder 14 in the working sequence to be explained hereinafter.

The aperture 45 is cylindrical and is closed by a head 49 of a double acting hydraulic cylinder 50. The piston 51 of the cylinder 50 has a rod 52 which passes through the head 49 to become inserted by a ferrule 53 alternately into the chambers 28, 29 to act on the pistons 30, 31 such that they slide from the left to the right relative to the drawings.

During this sliding movement, the piston 30, 31 compresses the water remaining in the chamber 28, 29 which, not being able to escape by other means, violently traverses the diffuser filter 42 to perfectly wash it, and then discharges into the casing 10 and through the aperture 48.

The aperture 46 opposite the aperture 45 is also cylindrical, and is closed by a head 54 so as to form a hydraulic cylinder 55. A piston 56 with a return spring 9 slides in the cylinder 55 and carries a counter-filter 57 designed to cooperate alternately with the diffuser filters 42 and the annular gasket 60 surrounding the counter-filter 57 which at the right moment is pressed against the edges of the ends of the infusion cylinder 14 to provide a seal between 14 and 56.

A duct 58 extends from the counter-filter 57 through the piston 56 and head 54 to terminate in a distribution spout 59 for the infusion.

Finally, the cylinder 55 is surrounded by an annular heating chamber 61 fed with hot water.

The aperture 47 is directly connected to a feed duct 62 for the coffee powder provided by a grinder 63 via a dosing unit 64, the grinder 63 being operated by a hydraulic cylinder 65.

The components 62, 63, 64 may be of any conventional type known to experts of the art, and are therefore not described or illustrated in detail.

The aperture 48 opposite the aperture 47 houses a nozzle 66 which injects a water jet for removing the used coffee grounds from the filters, to discharge them downstream.

The operation of the machine heretofore described is as follows.

With reference to the hydraulic circuit of FIG. 1, on pushing the pushbutton 67 for the three-way valve 68, the return of which is controlled, pressurised water is fed to the cylinder 65 which operates the dosing unit 64 of the grinder 63, which via the duct 62 delivers a predetermined dose of ground coffee C to that chamber of the infusion cylinder facing it above the filter 42, which in the case shown in FIG. 4 is that indicated by the reference numeral 28. The opposing chamber 29 lies with its filter 42 at the wash jet 66 for discharging the used coffee cake.

The same pressurised water feed reaches the flow deviator 67 which, via the unidirectional flow regulator 101, feeds it with a suitable lag to the pilot 71 of the five-way valve 72, which starts the hydraulic motor 21 via the delivery 73, at a speed regulated by the unidirectional flow regulator 74.

Consequently, the infusion cylinder 14 is urged to rotate by 90° in the direction of FIG. 2. On termination of this 90° rotation, the motor 21, via the lever 75, operates the plunger 76 of the normally closed three-way valve 77, which feeds pressurised water to the pilot 78 of the valve 72, which via its delivery 79 reverses the direction of rotation of the motor, which returns to the previous starting position.

The delivery of the valve 77 is also connected to the pilots 80, 81 of the valve 68 and three-way controlled return valve 82 for stopping the cycle respectively.

With a suitable lead time, the rod 83, which rotates with the infusion cylinder, has already operated the lever 84 of the three-way controlled return valve 85 which feeds pressurised water to the following components:

To the cylinder 65 of the grinder, which thus returns to its rest position.

To the dosing cylinder 86 and pilot 87 of the controlled three-way valve 88, the delivery of which is displaced to 89 so as to feed the infusion water measure to the boiler 11.

The infusion water measure, according to the invention, may be easily controlled as shown in FIG. 5 by regulating the angular position of a limit helix 90 against which the ferrule 91 of the piston rod 92 of the dispensing cylinder 86 abuts and pushes.

To this end, the helix 90 is fixed to one end of a shaft 93 which rotates and moves axially in a bush 94 which rotates in its turn in a support 95. The axial excursion of the shaft 93, in both directions, is determined by a pin 96 fixed thereto and slidable in a slot 97 of determined length provided in the bush 94.

The pin and slot connect together the shaft and bush for rotation in the support 95.

A spring 98 tends to keep the rear face of the helix 90 removed from the plunger 99 of the valve 82. At the end further from the helix 90, the shaft 93 is provided with an operating knob 100 by rotating which it is possible to vary the angular position of the helix 90. In this manner it is apparent that the stroke limit of the piston of the cylinder 86, and consequently the measure of water fed to the boiler 11, may be varied at will via the rod 92.

Simultaneously, the valve 85 feeds pressurised water to the cylinder 50, because of which the ferrule 53 is urged by the piston 51 to become inserted in the chamber 29 of the infusion cylinder, so as to strongly press the dose C of powdered coffee between the diffuser filter 42 and counter-filter 57, so displacing the distribution chamber 33 such that the water measure heated by the boiler 11 reaches the chamber 28 of the infusion cylinder 14 (FIG. 3) via 36, 35, 33 and 37, and also washing the diffuser filter opposite that by which the dose of ground coffee is compressed.

At the same moment the cylinder 55 is also put under pressure, so that the piston 56 presses the gasket 60 strongly against the infusion cylinder, to give a perfect seal.

In this position the machine prepares the infusion with the measure of high pressure hot water which passes through the distribution 33-34-35-37-38, the bores 44, the coffee powder held between the filter and counter-filter, and the duct 58 to emerge in the form of an infusion from the delivery spout 59.

The delivery of the infusion terminates as soon as the ferrule 91 of the dispensing cylinder 86 presses the helix 90 against the plunger 99 of the valve 82.

When the valve 82 is controlled in this manner, the following functions are effected by pressurised water feed.

By means of the deviator 67 and unidirectional flow regulator 101, it operates the pilot 71 of the valve 72 with a certain lag, and this latter by its delivery 73 starts the hydraulic motor 21 which rotates the infusion cylinder 14 through 90° (after the ferrule 53 withdraws and the cylinder 55 is put to exhaust) so as to bring the chamber 28 into a position corresponding with the wash jet 66. The motor 21 then returns to its initial position by means of the valves 72 and 77, in the manner already described.

The valve 85 closes via the pilot 102.

Via the pilot 103, the valve 88 connects to exhaust the dispensing cylinder 86 which retracts its rod 92, the cylinder 50 which retracts the ferrule 53 from the chamber 29 of the infusion cylinder, and the cylinder 55 which releases the compressed gasket 60, so as to enable the infusion cylinder to rotate freely.

In the course of said operating stages, the high pressure discharges from the dispensing cylinder 86 and hydraulic motor 21 are fed to the nozzle 66 which removes the used coffee cake, which is discharged downstream.

The cycle terminates at this point, and all the elements are set for the next cycle.

The advantages of the machine according to the invention may be summarised as follows.

The pressure exerted on the coffee powder during infusion ensures maximum utilisation of the flavour and thus makes it possible to obtain an excellent drink coupled with coffee economy.

The positively controlled compression of the gasket 60 solves the problem of the seal between the mobile and stationary parts.

The infusion cylinder 14 is perfectly phased at each 180° rotation by the tapered ferrule 53, which also keeps it rigidly in position against the action of the pressurised water arriving from the duct 35 and enables the diffuser filter 42 to be washed.

The measure of the infusion may be proportioned by a simple manual control extremely accurately over a theoretically infinite range. The maximum variation in the required concentration corresponds to a rotation of 360° of the helix 90. A half variation corresponds to a rotation of 180°, a quarter variation to a rotation of 90° etc.

As the machine is constructed entirely of hydraulic components, it is of simple and reliable operation, and of minimum maintenance which is easy and rapid to carry out, and economical.

The machine carries out a working cycle completely automatically without the manual intervention of the operator. In consequence, the machine is already suitable for operation by a coin box, to which it may be immediately coupled.

Although a preferred embodiment of the invention has been illustrated and described in detail, variations and modifications may be made thereto without leaving the scope of the inventive idea.

For example, the cylinder 86 may also be used as a timer for cutting off the flow of boiling water forming the infusion at the required moment. Using such an arrangement allows the time for preparing the drink to be set. By increasing the time a more dilute infusion of greater volume is obtained, and vice versa.

The scope of the invention is defined by the following claims.

What we claim is

1. An automatic machine for preparing infusions, in particular of coffee, comprising in combination an infusion unit including a casing (13) with four apertures (45, 46, 47, 48) disposed at 90° one to another, a heat insulatable infusion cylinder (14) with two opposing chambers (28, 29) means for feeding said opposing chambers alternately with a predetermined measure of hot water under pressure from a boiler (11) fed by a hydraulic dispensing cylinder (86);

two hydraulic pistons (30, 31) carrying a filter (42), mobile respectively in said chambers (28, 29) and interconnected by a central rod (32) slidable in an intermediate chamber (33) to which the hot infusion water is fed, and is then fed through passages (37, 38) alternately into the chambers (28, 29) respectively, and then through the filter (42) via bores (44);

a hydraulic motor (21) rotating said infusion cylinder (14) stepwise so that its two chambers (28, 29) become successively aligned with the four apertures (45, 46, 47, 48);

at the apertures (45, 46) there are located two respective opposing hydraulic pistons (51, 56) for pressing one of the two filter-carrying pistons (30, 31) against a counterfilter (57) there is clamped a predetermined does of coffee powder previously fed through the aperture (47), said dose being traversed by the hot water required for preparing the infusion which is delivered through a duct (58) partly provided in the piston (56), the used coffee cake being discharged downstream through the aperture (48) by a nozzle also fed with high pressure water; and an assembly of suitably interconnected hydraulic components arranged to control and program all the various stages of the cycle.

2. A machine as claimed in claim 1, wherein between said infusion cylinder (14) and said piston (56) there is provided a gasket (60) urged by this latter to form a seal against said cylinder (14).

3. A machine as claimed in claim 1, wherein said hydraulic dispensing cylinder (86) is a double acting cylinder having a piston rod (92) cooperating with a single-piece adjustable stroke limiting element (90), for moving axially against the action of a return spring (98) and operating a valve (82) of the hydraulic circuit causing the preparation of the infusion to cease and to return all the components of the machine into their starting position ready for a new working cycle.

4. A machine as claimed in claim 3, wherein said stroke limiting element (90) is a helix the angular position of which is manually adjustable.

5. A machine as claimed in claim 3, wherein said single piece stroke limiting element is an inclined plane element the longitudinal position of which is manually adjustable.

6. A machine as claimed in claim 1, the various stages of which are controlled and governed exclusively by hydraulic components.

* * * * *